United States Patent
Saito et al.

(10) Patent No.: US 7,180,518 B2
(45) Date of Patent: Feb. 20, 2007

(54) IMAGE PROCESSING APPARATUS, IMAGE PROCESSING SYSTEM, AND IMAGE PROCESSING METHOD

(75) Inventors: Takahiro Saito, Kanagawa (JP); Kenichi Mori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/896,941

(22) Filed: Jul. 23, 2004

(65) Prior Publication Data

US 2005/0179695 A1    Aug. 18, 2005

(30) Foreign Application Priority Data

Feb. 18, 2004   (JP)   .............. 2004-040729

(51) Int. Cl.
*G06F 15/82* (2006.01)
(52) U.S. Cl. ............ 345/505; 345/581; 345/611; 345/428; 345/501
(58) Field of Classification Search ........ 345/424–428, 345/441, 501–505, 581–588, 611–613
See application file for complete search history.

(56) References Cited

U.S. PATENT DOCUMENTS

| | | | | |
|---|---|---|---|---|
| 4,821,334 | A * | 4/1989 | Ogino et al. ............ | 382/270 |
| 6,005,582 | A * | 12/1999 | Gabriel et al. ............ | 345/586 |
| 6,219,060 | B1 * | 4/2001 | Ludke et al. ............ | 345/424 |
| 6,532,013 | B1 | 3/2003 | Papakipos et al. | |
| 6,646,648 | B1 * | 11/2003 | Donham ............ | 345/582 |
| 6,704,018 | B1 | 3/2004 | Mori et al. | |
| 6,731,301 | B2 * | 5/2004 | Sato et al. ............ | 345/613 |

(Continued)

FOREIGN PATENT DOCUMENTS

EP    0 681 267 A2    11/1995

(Continued)

OTHER PUBLICATIONS

R. Zonenschein, et al., "Towards Interactivity on Texturing Implicit Surfaces: A Distributed Approach", 9th International Conference in Central Europe on Computer Graphics, vol. 2, XP-002342970, 2001, pp. 360-366.

(Continued)

*Primary Examiner*—Mark Zimmerman
*Assistant Examiner*—Jwalant Amin
(74) *Attorney, Agent, or Firm*—Oblon, Spivak, McClelland, Maier & Neustadt, P.C.

(57) ABSTRACT

An image processing apparatus, comprising: a pixel generation unit configured to generate parameters of pixels in stamps based on values of typical pixels in the stamps having a plurality of pixels and derivatives of the parameters characterizing the image; a plurality of calculation processing units, each performing image processing of the stamps different from each other based on the parameters of the pixels generated by said pixel generation unit; and a texture processing unit configured to perform processing related to texture data in accordance with instructions from said plurality of calculation processing units, wherein each of said plurality of calculation processing units has a plurality of calculators which perform image processing of adjacent pixels in the corresponding stamp in parallel; and said pixel generation unit supplies the parameters of the adjacent pixels in the stamp which have no dependence to each other, to said plurality of calculation processing units, respectively.

20 Claims, 7 Drawing Sheets

U.S. PATENT DOCUMENTS

2003/0197716 A1* 10/2003 Krueger .................. 345/629
2004/0075661 A1* 4/2004 Yamaguchi et al. ........ 345/441
2004/0196290 A1* 10/2004 Satoh ..................... 345/505

FOREIGN PATENT DOCUMENTS

EP        1 001 369 A2    5/2000

OTHER PUBLICATIONS

A. Blaszczyk, et al., "Experience with PVM in an Industrial Environment", Parallel Virtual Machine-EUROPVM '96, XP-002343470, pp. 174-179.

* cited by examiner

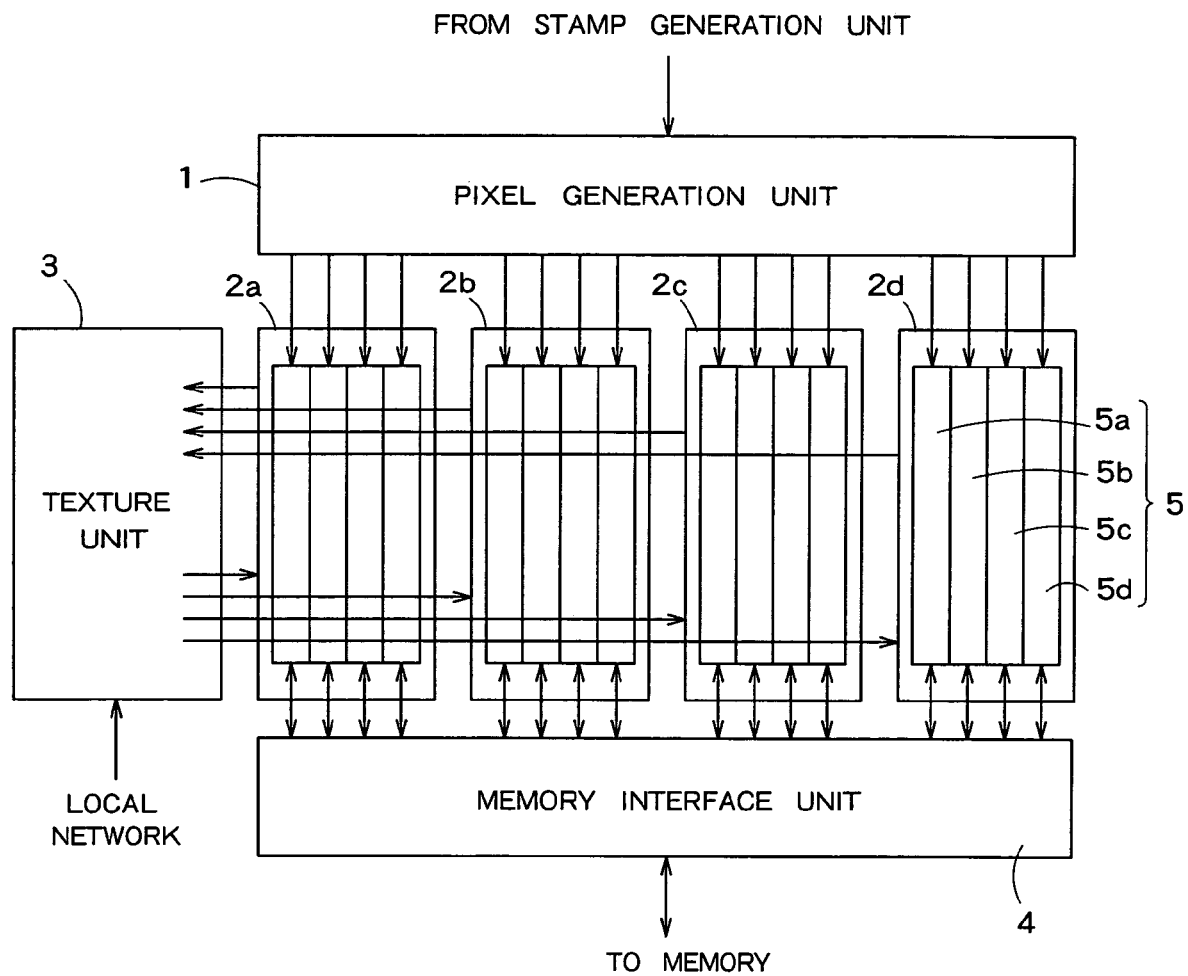
F I G. 1

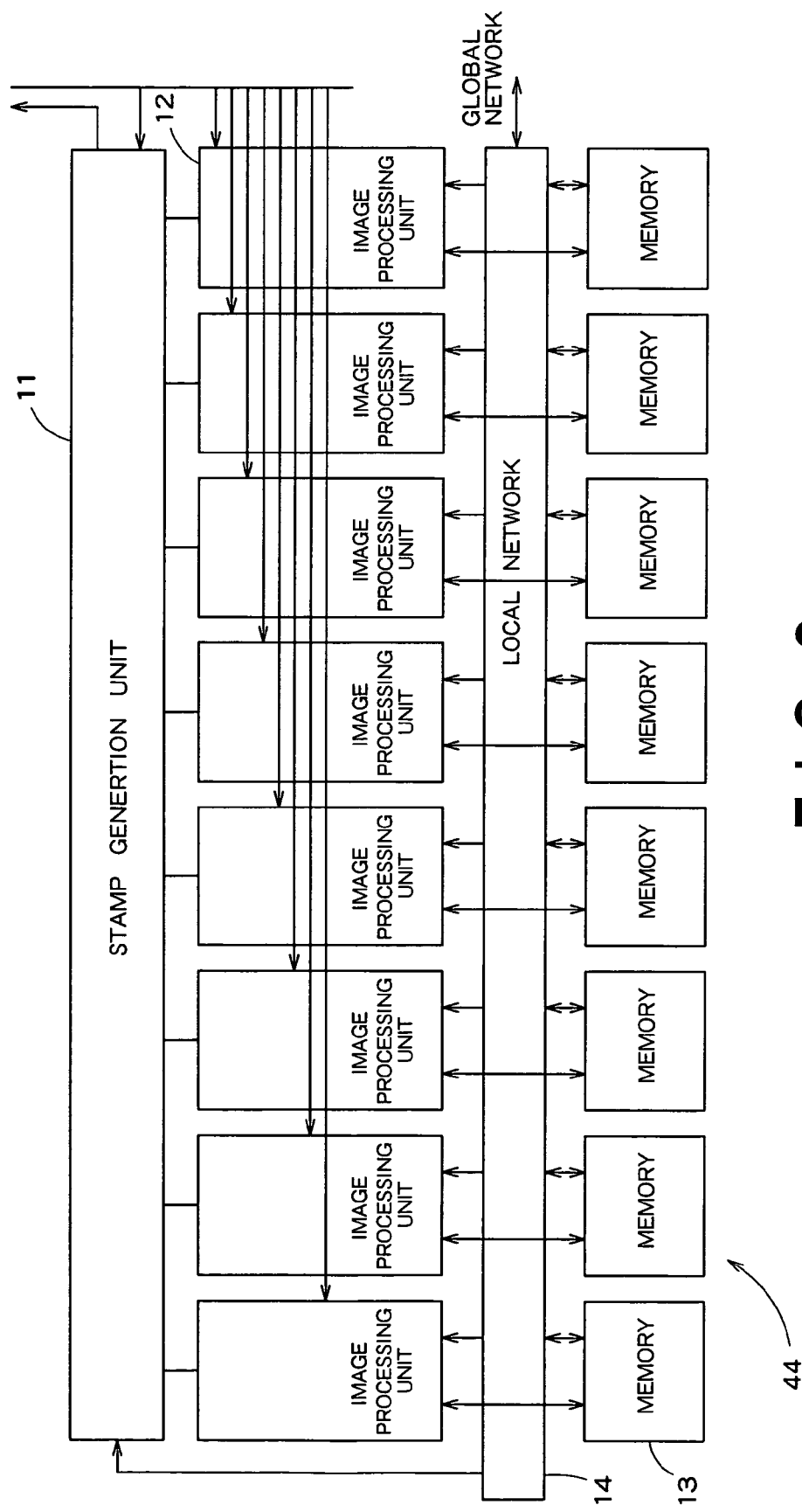
F I G. 2

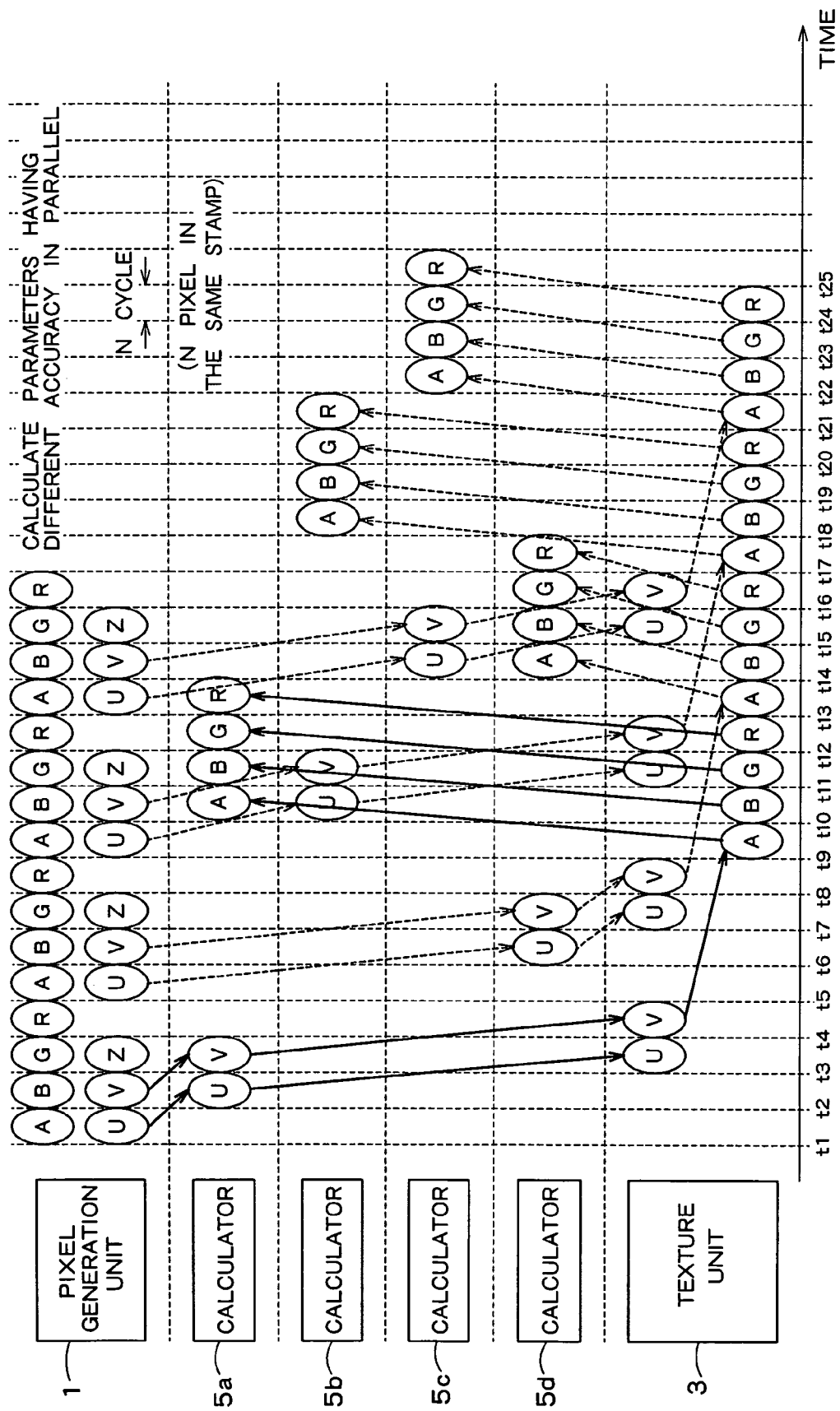
F I G. 5

IMAGE PROCESSING APPARATUS, IMAGE PROCESSING SYSTEM, AND IMAGE PROCESSING METHOD

CROSS REFERENCE TO RELATED APPLICATIONS

This application claims benefit of priority under 35USC§119 to Japanese Patent Application No. 2004-40729, filed on Feb. 18, 2004, the entire contents of which are incorporated by reference herein.

BACKGROUND OF THE INVENTION

1. Field of the Invention

The present invention relates to an image processing apparatus, an image processing system and an image processing method which perform image processing using a texture.

2. Related Background Art

Texture data is widely used to express texture of the surface on an object. Different texture data are pasted on an image of the same object to give a completely different impression to the object image in texture, thereby a three-dimensional image having perception of depth.

In three-dimensional image processing, a curved surface is expressed by sets of polygons. However, in actual drawing, each of the polygons is decomposed into pixels.

In order to increase the speed of the three-dimensional image processing, a plurality of different pixels are desirably processed in parallel to each other. For this reason, there has been proposed a method of speeding up image processing by processing a plurality of blocks in parallel in units of a block consisted of a plurality of pixels (U.S. Pat. No. 6,532,013). However, to perform drawing in one block, there is a case where pixel information in the other block is needed. For example, there is a case where color in one block affects color in the other block. Image processing cannot be performed in parallel for the blocks having such dependence. For this reason, even if parallel processing is possible, the parallel processing cannot be actually performed in many cases.

When image processing is continuously performed to the same pixel, the image processing can be smoothly performed because the operation frequency of a conventional image processing processor is not very high. With a recent image processing processor having a high operation frequency, it would be difficult to perform the image processing.

SUMMARY OF THE INVENTION

The present invention has been made to solve the above problem, and has as its object to provide an image processing apparatus, an image processing system and an image processing method which can efficiently perform image processing.

According to one embodiment of the present invention, a n image processing apparatus, comprising:

a pixel generation unit configured to generate parameters of pixels in stamps based on values of typical pixels in the stamps having a plurality of pixels and derivatives of the parameters characterizing the image;

a plurality of calculation processing units, each performing image processing of the stamps different from each other based on the parameters of the pixels generated by said pixel generation unit; and a texture processing unit configured to perform processing related to texture data in accordance with instructions from said plurality of calculation processing units, wherein each of said plurality of calculation processing units has a plurality of calculators which perform image processing of adjacent pixels in the corresponding stamp in parallel; and said pixel generation unit supplies the parameters of the adjacent pixels in the stamp which have no dependence to each other, to said plurality of calculation processing units, respectively.

Furthermore, according to one embodiment of the present invention, a n image processing system, comprising:

a stamp generation unit configured to calculate values of typical pixels in stamps having a plurality of pixels and derivatives of parameters characterizing image;

a plurality of image processing apparatuses which perform image processing in parallel based on a result calculated by said stamp generation unit; and a storage which stores a result processed by said plurality of image processing apparatuses, wherein each of said plurality of image processing apparatuses includes:

a pixel generation unit configured to generate parameters of the pixels in the stamps based on the values of the typical pixels in the stamps having a plurality of pixels and the derivatives of the parameters characterizing image;

a plurality of calculation processing units configured to perform image processing of the stamps different from each other based on the parameters of the pixels generated by said pixel generation unit; and a texture processing unit configured to perform processing related to the texture data in accordance with instructions from said plurality of calculation processing units, each of said plurality of calculation processing units has a plurality of calculators which perform image processing of the adjacent pixels in the corresponding stamp in parallel, and said pixel generation unit supplies the parameters of the adjacent pixels in the stamps which have no dependence to each other, to said plurality of calculation processing units, respectively.

BRIEF DESCRIPTION OF THE DRAWINGS

FIG. 1 is a block diagram showing a schematic configuration of an image processing apparatus according to an embodiment of the present invention.

FIG. 2 is a block diagram showing an example of the specific configuration of an image processing unit in which image processing apparatuses shown in FIG. 1 are embedded a plurality of pieces.

FIG. 5 is an operation timing chart of the image processing apparatuses 12 in FIG. 1.

DESCRIPTION OF THE PREFERRED EMBODIMENTS

Figure 3:
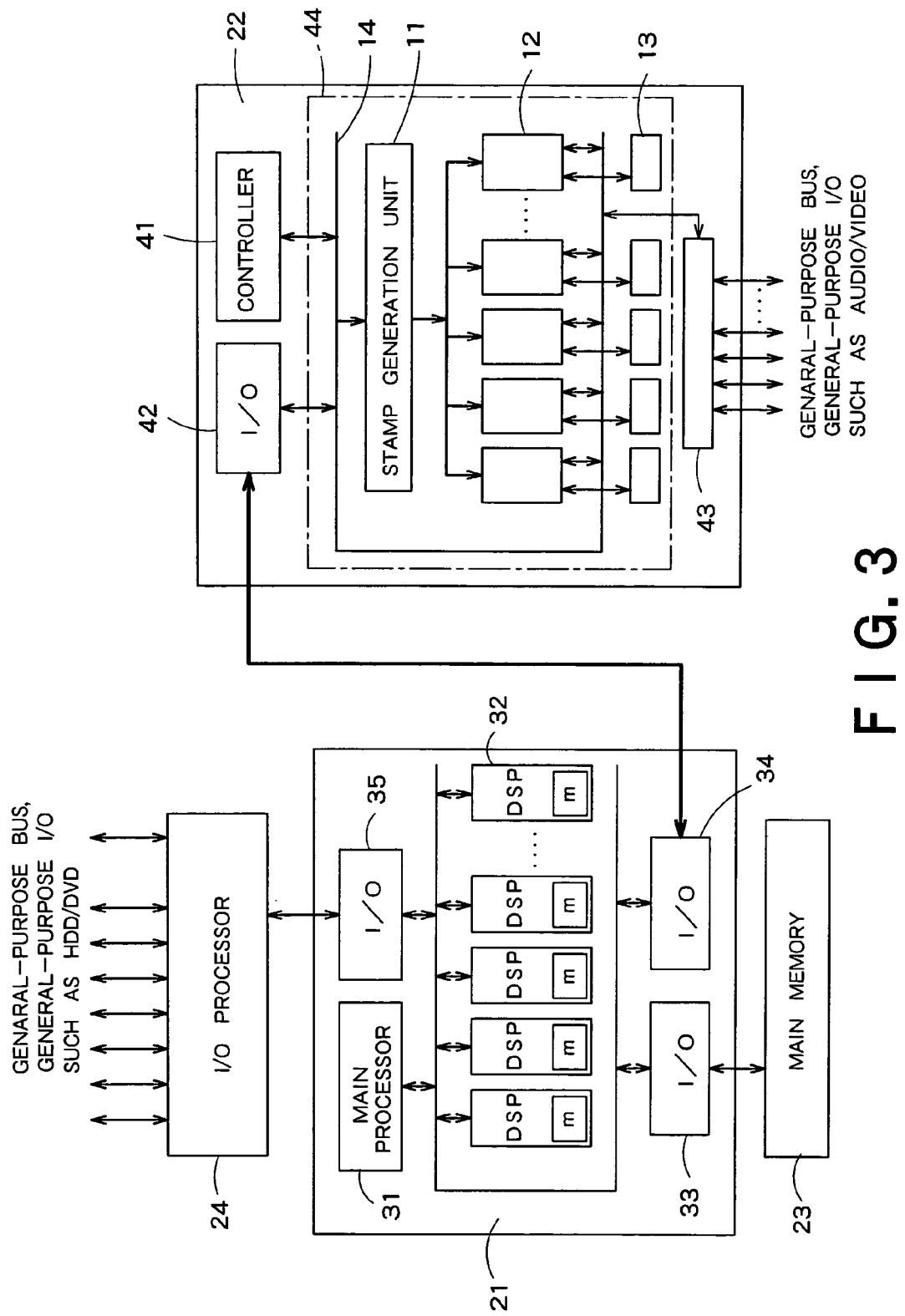
FIG. 3 is a block diagram showing an example of the schematic configuration of a processor system comprising a host processor and an image processing processor.

An embodiment of the present invention will be described below with reference to the accompanying drawings.

FIG. 1 is a block diagram showing a schematic configuration of an image processing apparatus according to an embodiment of the present invention. The image processing apparatus shown in FIG. 1 comprises a pixel generation unit 1 which generates parameters of pixels, a plurality of shader processing units 2a, 2b, 2c, and 2d, a texture unit 3 which performs texture processing, and a memory interface unit 4 which stores processing results of the shader processing units 2a, 2b, 2c, and 2d.

The shader processing units 2a to 2d have scalar calculators 5a, 5b, 5c, and 5d (to be also referred to also as calculators 5) using an SIMD (Single Instruction Multiple Data) scheme, respectively. The plurality of calculators 5 in the same shader processing units 2a to 2d perform calculation processes in parallel.

The image processing apparatus in FIG. 1 performs image processing in units of stamps constituted by a plurality of adjacent pixels (for example, 4×4 pixels). The number of pixels constituting the stamp is not limited to a specific number. However, a case in which the stamp is constituted by 4×4 pixels will be described below.

Parameters generated by the pixel generation unit 1 and the shader processing units 2a to 2d are tone values or RGB, transparencys, depths, texture coordinates, normal vectors, and the like.

The number of shader processing units 2a to 2d shown in FIG. 1 and the number of scalar calculators 5a to 5d in the shader processing units 2a to 2d are not limited to specific numbers.

FIG. 2 is a block diagram showing an example of the specific configuration of an image processing unit in which image processing apparatuses shown in FIG. 1 are embedded in a plurality of pieces. The image processing unit in FIG. 2 comprises stamp generation unit 11 which decomposes a polygon into pixels to generate a stamp, a plurality of image processing apparatuses 12 shown in FIG. 1, and a memory 13. The stamp generation unit 11, the image processing apparatuses 12, and the memory 13 are connected to a local network 14.

The stamp generation unit 11 calculates the value of a typical pixel in the stamp and (partial) derivatives of the parameters for each stamp consisted of 4×4 adjacent pixels, and supplies the calculation results to the corresponding image processing apparatus 12. The plurality of the image processing apparatuses 12 can perform processings in parallel to each other. That means the plurality of image processing apparatuses 12 perform image processing for different stamps, respectively.

On the basis of the value of the typical pixel in the stamp and the (partial) derivatives of the parameters calculated by the stamp generation unit 11, the shader processing units 2a to 2d shown in FIG. 1 in the image processing apparatus 12 generate the parameters of pixels in the stamp.

Since the image processing apparatuses 12 shown in FIG. 2 perform image processing in parallel, the image processing can be performed at a high speed.

The image processing unit in FIG. 2 is arranged inside the image processing processor. The image processing processor is connected to a host processor through a global network.

FIG. 3 is a block diagram showing an example of the schematic configuration of a processor system comprising a host processor and an image processing processor.

The processor system in FIG. 3 comprises a host processor 21, an image processing processor 22, a main memory 23, and an I/O processor 24.

The host processor 21 has a main processor 31, a plurality of signal processors (DSP: Digital Signal Processors) 32, and I/O units 33, 34, and 35 which control input/output operations for an external circuit. The I/O unit 33 controls an input/output operation for the main memory 23, the I/O unit 34 controls an input/output operation for the image processing processor 22, and the I/O unit 35 controls an input/output operation for the I/O processor 24.

The image processing processor 22 has a controller 41, an I/O unit 42 which exchanges data with the host processor 21, various general-purpose buses such as PCI, an I/O unit 43 which controls an input/output operation of video and audio data or the like, and an image processing unit 44 shown in FIG. 2.

The I/O processor 24 controls connections to peripheral devices such as an HDD and a DVD drive and a network.

The image processing of the image processing unit 44 is performed in parallel to processing of the host processor 21. For this reason, the host processor 21 itself need not perform three-dimensional image processing, and a processing load on the host processor 21 can be reduced. At the same time, three-dimensional image processing can be performed at a high speed.

Figures 4A, 4B:
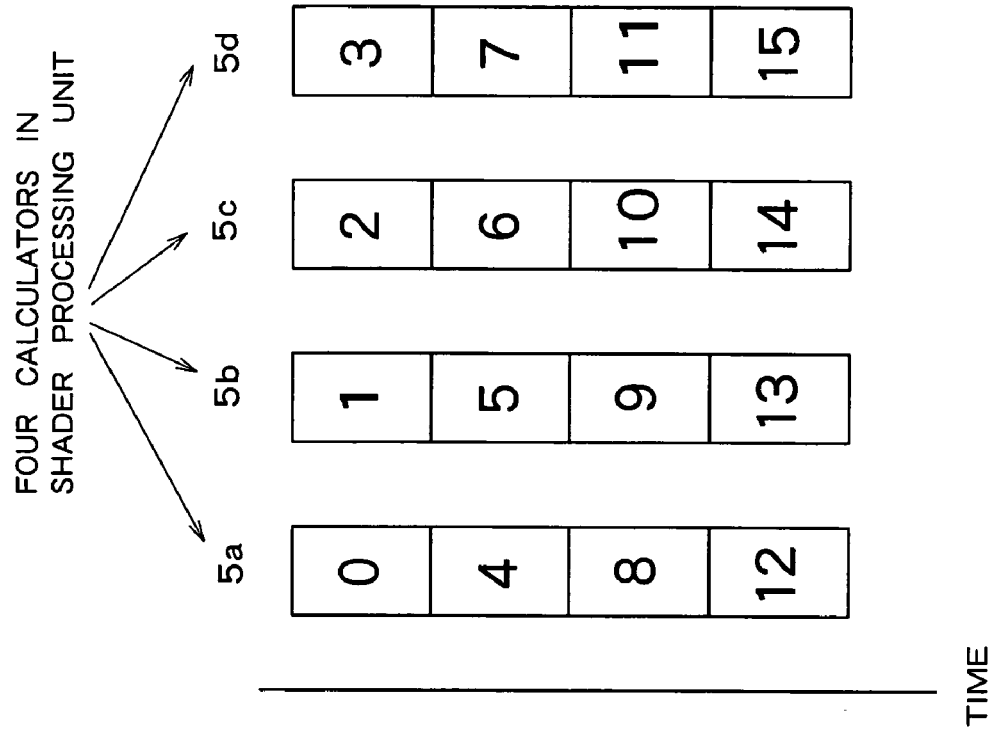
FIG. 4 is a diagram for explaining a transfer operation of parameters from the pixel generation unit 1 shown in FIG. 1 to the four calculators 5 in the shader processing units 2a to 2d.

FIG. 4 is a diagram for explaining a transfer operation of parameters from the pixel generation unit 1 shown in FIG. 1 to the four calculators 5 in the shader processing units 2a to 2d. As shown in FIG. 4, the parameters of the 2×2 pixels adjacent to each other in the stamp constituted by 4×4 pixels are supplied to each of the calculators 5 pixel by pixel. In the example in FIG. 4, in the first cycle, the parameter of pixel 0 is supplied to the calculator 5a, the parameter of pixel 1 is supplied to the calculator 5b, the parameter of pixel 2 is supplied to the calculator 5c, and the parameter of pixel 3 is supplied to the calculator 5d.

In the next cycle, the parameters of pixels 4, 5, 6, and 7 are supplied to the calculators 5a to 5d, respectively. In the next cycle, the parameters of pixels 8, 9, 10, and 11 are supplied to the calculators 5a to 5d, respectively. In the next cycle, the parameters of pixels 12, 13, 14, and 15 are supplied to the calculators 5a to 5d, respectively.

In this manner, the parameters of the adjacent pixels are supplied to the four calculators 5a to 5d in the same shader processing units 2a to 2d at the same timing, and the calculators 5 perform calculation processes in parallel to each other. One of processes performed by each of the calculators 5 is a process of supplying texture coordinates included in the parameters supplied from the pixel generation unit 1 to the texture unit 3.

The texture unit 3 acquires texture data corresponding to the texture coordinates supplied from the calculators 5 through the local network 14. The texture unit 3 calculates an LOD by using the texture coordinates. The LOD is a coefficient used to determine the size of texture data. In addition, the texture unit 3 calculates an anisotropy by using the texture coordinates. When the LOD and the anisotropy are calculated, partial differential values dudx, dudy, dvdx, and dvdy are calculated in the beginning by using texture coordinates (U00, V00), (U0, V10), (U01, V01), and (U11, V11) of 2×2 pixels. The 2×2 pixels are supplied from the four calculators 5a to 5d in the same shader processing unit. Equations used at this time are expressed by the following equations (1) to (4):

$$dudx = (f(U10-U00)+f(U11-U01)) \times 0.5 \quad (1)$$

$$dudy = (f(U01-U00)+f(U11-U10)) \times 0.5 \quad (2)$$

$$dvdx = (f(V10-V00)+f(V11-V01)) \times 0.5 \quad (3)$$

$$dvdx = (f(V01-V00)+f(V11-V10)) \times 0.5 \quad (4)$$

The LOD and the anisotropy are calculated by using the equations (1) to (4) as expressed by the following equations (5) to (10). However, any calculation method may be used:

$$du = abs(dudx) + abs(dudy) \quad (5)$$

$$dv = abs(dvdx) + abs(dvdy) \quad (6)$$

$$P\max = \max(du, dv) \quad (7)$$

$$P\min = \min(du, dv) \quad (8)$$

$$LOD = K + \log 2(P\min) \quad (9)$$

$$\text{anisotropy} = \min(\text{ceil}(P\max/P\min), \text{anisoMax}) \quad (10)$$

In this manner, in this embodiment, since the LOD and the anisotropy are calculated on the basis of the texture coordinates of the 2×2 pixels supplied from the four calculators 5a to 5d in the same shader processing unit, these calculations can be easily performed at a high speed.

The texture unit 3 calculates an LOD and an anisotropy every 2×2 pixels. More specifically, on the basis of the texture coordinates of the 2×2 pixels supplied from the four calculators 5a to 5d in the shader processing units 2a to 2d, the texture unit 3 calculates LODs and anisotropies.

The size of texture data is determined depending on the values of the LODs, and an aspect ratio of the texture data is determined depending on the values of the anisotropies. On the basis of the results, the texture data are read and supplied to the corresponding calculators.

FIG. 5 is an operation timing chart of the image processing apparatuses 12 in FIG. 1. One segment in the axis of time in FIG. 5 corresponds to N cycle (for example, N=1), the parameters of one stamp are performed in N cycle.

All symbols A, B, G, R, U, V, and Z in FIG. 5 indicate parameters, respectively. Parameter A is a transparency, parameters R, G, and B are tone values of RGB, parameters U and V are texture coordinates, and parameter Z is a depth.

Parameters in one stamp are processed in N cycle. Since the four calculators 5 are arranged in the shader processing units 2a to 2d, four pixels are processed in each cycle. Each stamp is constituted by 4×4 pixels. For this reason, one parameter is processed in one stamp in N=4 cycles accordingly.

In the example in FIG. 5, the pixel generation unit 1 performs parallel processing for some parameters, processing of all the parameters in one stamp is completed in 4N cycles. The parameters are not necessarily processed in parallel.

Upon completion of the parameter generation process of one stamp, the pixel generation unit 1 performs processing for another stamp. In the example in FIG. 5, the pixel generation unit 1 continuously performs image processing for four different stamps. The processing results of the pixel generation unit 1 are supplied to the shader processing units 2a to 2d.

The shader processing units 2a to 2d send the parameters sent from the pixel generation unit 1 to the texture unit 3 and receive corresponding texture data from the texture unit 3. The texture data and the parameters sent from the pixel generation unit 1 are used to generate final parameters.

The four shader processing units 2a to 2d in the image processing apparatus 12 may simultaneously perform processings in parallel to each other or may sequentially perform processings one by one. In any case, when the processings are performed, the shader processing units 2a to 2d operate at the operation timings in FIG. 5.

In the example in FIG. 5, the calculators 5a to 5d in the shader processing units 2a to 2d receive texture coordinates from the pixel generation unit 1 in periods t2 to t4 and transmit the received texture coordinates to the texture unit 3 in periods t3 to t5. The texture unit 3 generates texture data and transmit the generated texture data to the calculators in periods t9 to t13. The calculators receive the texture data from the texture unit 3 in periods t10 to t14 to generate parameters R, G, B, and A.

As shown in FIG. 5, since the pixel generation unit 1 continuously performs image processing of a plurality of stamps which have no dependence, there is no probability of interrupting processings in the shader processing units 2a to 2d to be supplied with the parameter from the pixel generation unit 1, and the speeds of image processings can be increased.

The dependence means that the parameter of a certain pixel is influenced by the parameter of another pixel. The pixel generation unit 1 of this embodiment checks the dependence between the plurality of stamps to supply the parameters of stamps which have no dependence to the different shader processing units 2a to 2d. For this reason, the processings are not necessarily interrupted in the shader processing units 2a to 2d.

Figure 6:
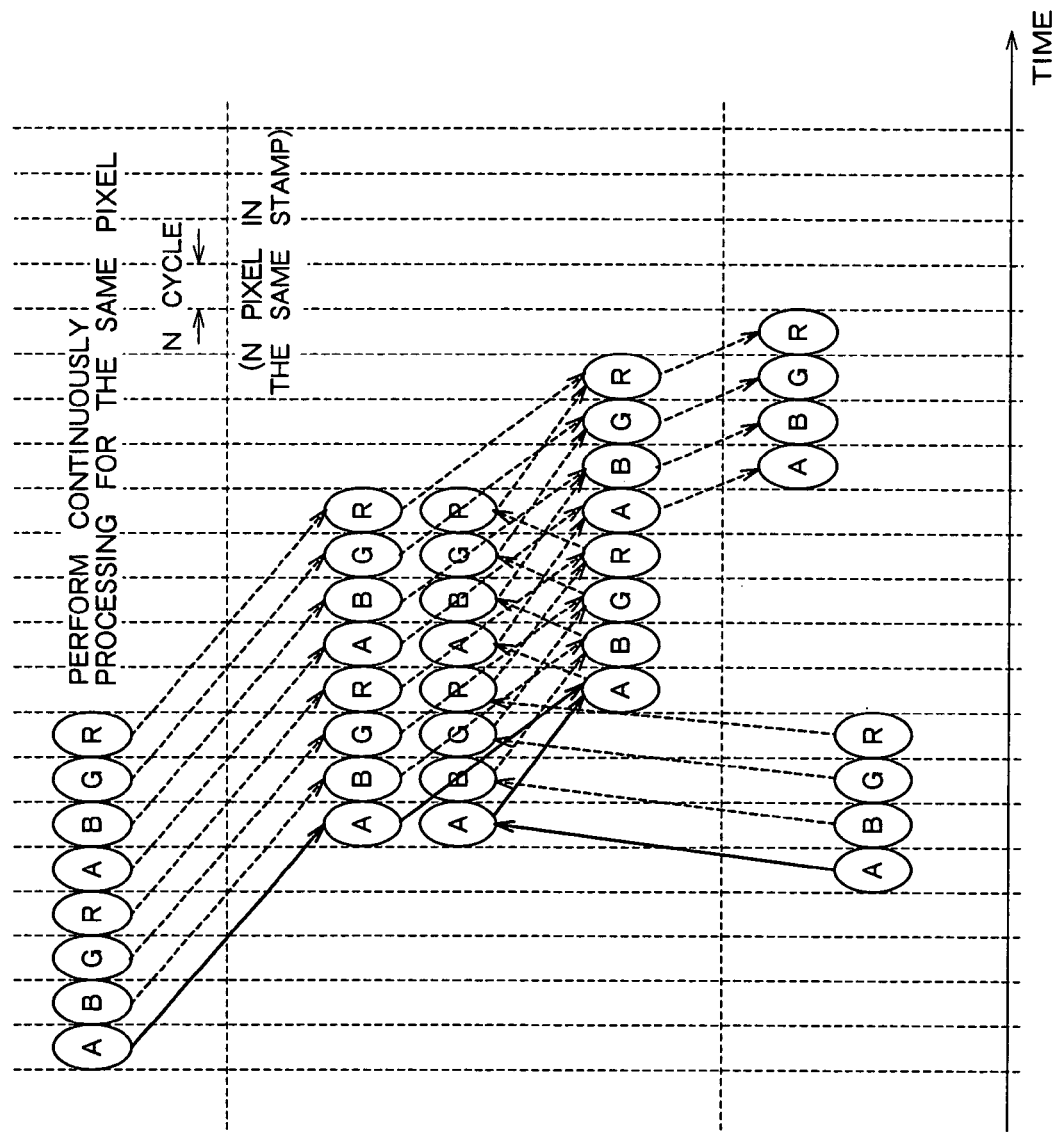
FIG. 6 is a diagram showing the internal configurations of the calculators 5a to 5d in the shader processing units 2a to 2d and process timings.
Figure 6:
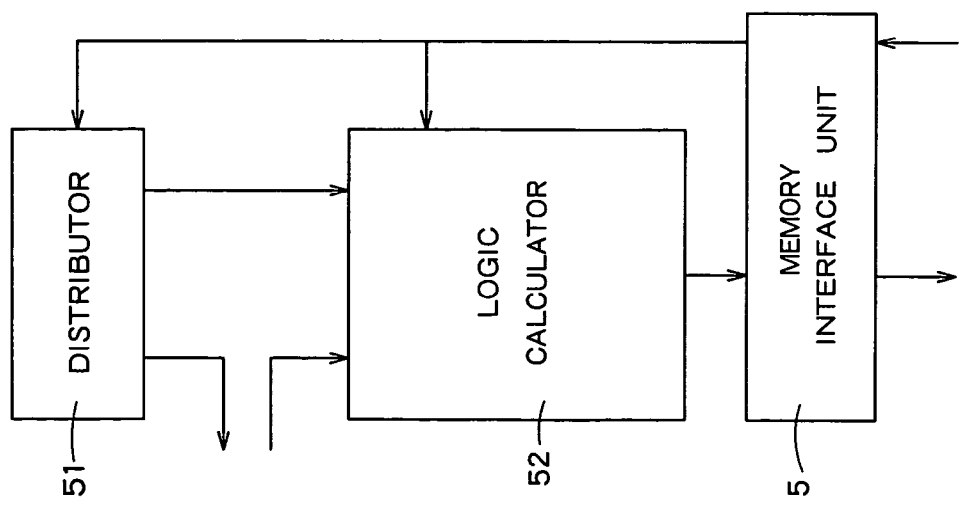

FIG. 6 is a diagram showing the internal configurations of the calculators 5a to 5d in the shader processing units 2a to 2d and process timings. Each of the shader processing units 2a to 2d has a distributor 51 and a logic calculator 52 as shown on the left of FIG. 6, and calculation results obtained from the logic calculator 52 is supplied to a memory interface unit 5.

A programmer must perform programming in consideration of an order of instructions in advance such that the calculators 5a to 5d in the shader processing units 2a to 2d are prevented from continuously performing calculations for the same parameter of the same pixel.

For example, in the case shown in FIG. 6, an order of the parameters supplied from the pixel generation unit 1 to the shader processing units 2a to 2d is given as A, b, G, R, A, B, G, R, . . . In this case, the shader processing units 2a to 2d can sequentially process the parameters without interrupting the processes.

Figure 7:
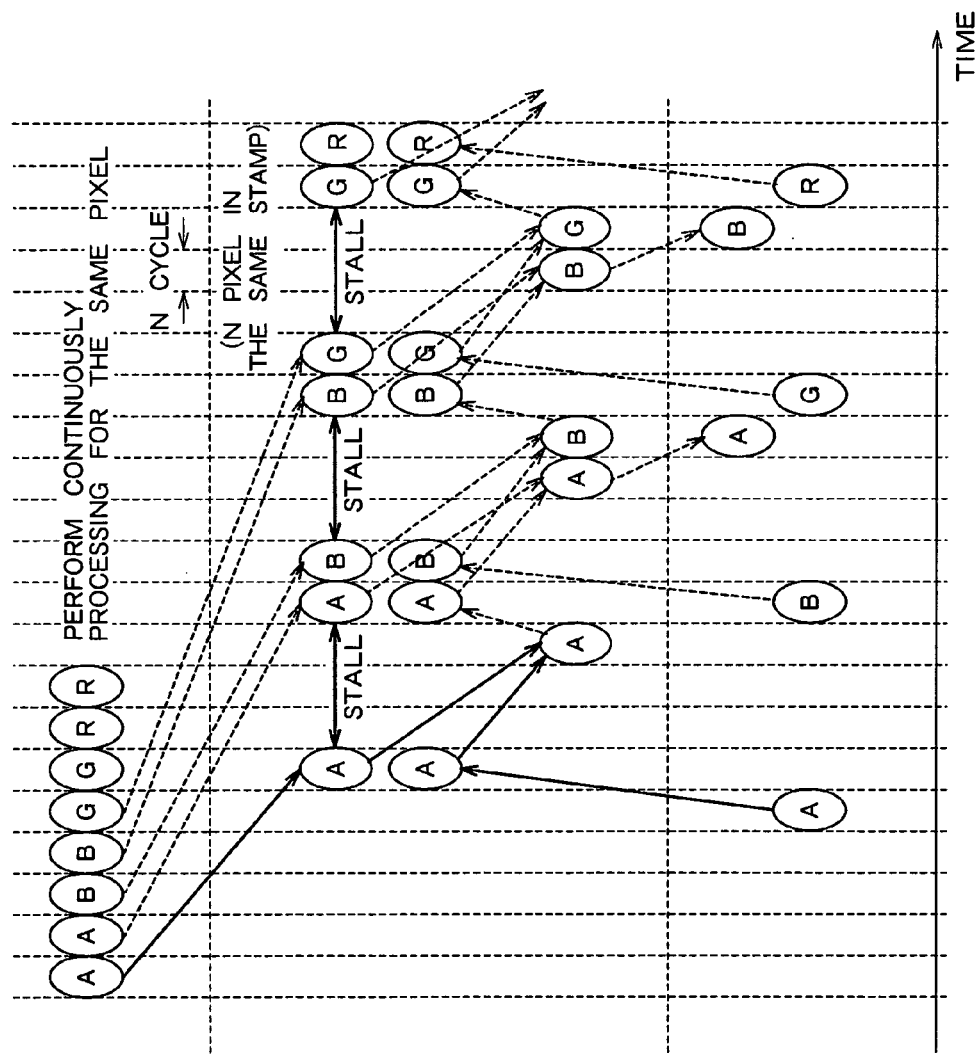
FIG. 7 is a diagram explaining the case where the programmer cannot perform continuously calculations for the same parameter of the same pixel.
Figure 7:
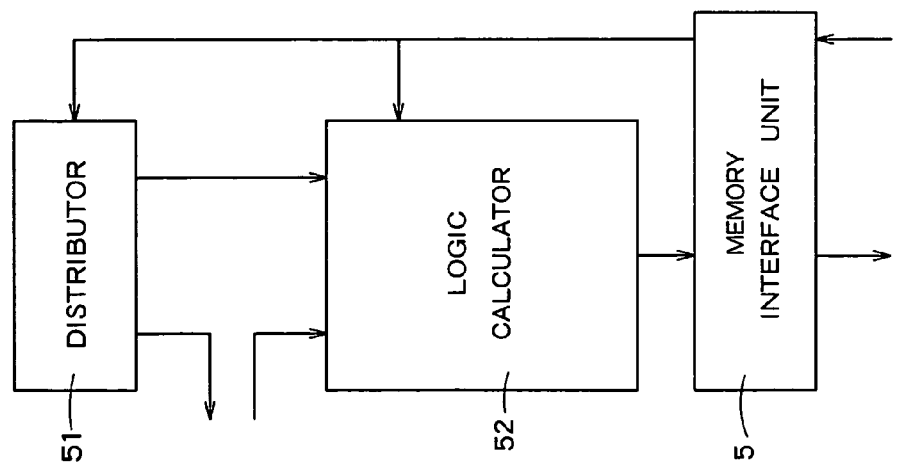

On the other hand, as shown in FIG. 7, when a programmer continuously performs calculations for the same parameter of the same pixel, the programmer cannot process the next parameter until the processing for the immediately preceding parameter is finished. For this reason, the processings in the shader processing units 2a to 2d are frequently interrupted, and the efficiency of the processings cannot be improved.

As described above, the pixel generation unit 1 according to this embodiment checks the dependence of a plurality of different stamps and supplies the parameters of the plurality of stamps which have no dependency to the shader processing units 2a to 2d. For this reason, the respective shader processing units 2a to 2d can perform processings in other shader processing units 2a to 2d in parallel with each other.

The pixel generation unit 1 supplies the parameters of adjacent pixels to the plurality of calculators 5 in the same shader processing units 2a to 2d. For this reason, the shader processing units 2a to 2d can simultaneously process a plurality of adjacent pixels (for example, 2×2 pixels). Since the texture unit 3 requires information of a plurality of adjacent pixels in calculation for an LOD or an anisotropy, results obtained by simultaneously processing a plurality of pixels in the respective shader processing units 2a to 2d can be continuously used in the texture unit 3, and image processings can be efficiently performed.

The concrete contents of image processings performed by the image processing apparatus shown in FIG. 1 are not specified. A three-dimensional image processing or a two-dimensional image processing may be used. The image processing apparatus shown in FIG. 1 is not necessarily used to be connected to the host processor 21 in FIG. 3. In addition, the chip may be constituted by only an image processing apparatus, and the image processing unit 22 in FIG. 3 is constituted as one chip. The host processor 21 and the image processing processor 22 shown in FIG. 3 may be constituted as one chip.

The image processing apparatus and the image processing system described in the above embodiment may be constituted as hardware or software. When the image processing apparatus and the image processing system are constituted as software, a program which realizes at least some functions of the image processing apparatus and the image processing system may be stored in a recording medium such as a floppy disk or a CD-ROM or the like, loaded on a computer, and then executed by the computer. The recording medium is not limited to a portable recording medium such as a magnetic disk or an optical disk. A fixed recording medium such as a hard disk drive or a memory may be used.

A program which realizes at least some functions of the image processing apparatus and the image processing system may be distributed through a communication network (including wireless communication) such as the Internet or the like. In addition, the program may be coded, modulated, or compressed and then distributed through a cable network or a wireless network such as the Internet. Alternatively, the program may be distributed being stored in a recording medium.

What is claimed is:

1. An image processing apparatus, comprising:
   a pixel generation unit configured to generate parameters of pixels in stamps based on values of typical pixels in the stamps having a plurality of pixels and derivatives of the parameters characterizing the image;
   a plurality of calculation processing units, each performing image processing of the stamps different from each other based on the parameters of the pixels generated by said pixel generation unit; and
   a texture processing unit configured to perform processing related to texture data in accordance with instructions from said plurality of calculation processing units,
   wherein each of said plurality of calculation processing units has a plurality of calculators which perform image processing of adjacent pixels in the corresponding stamp in parallel; and
   said pixel generation unit supplies the parameters of the adjacent pixels in the stamp which have no dependence to each other, to said plurality of calculation processing units, respectively, the parameters of the adjacent pixels in the stamp which have no dependence to each other indicating parameters of each pixel in a stamp are not influenced by parameters of each pixel in the other stamps.

2. The image processing apparatus according to claim 1, wherein said parameters include tone values of RGB, transparency information, depth information, texture coordinates and normal vectors.

3. The image processing apparatus according to claim 2, wherein said texture processing unit detects size of the texture data and aspect ratio thereof based on the texture coordinate of the adjacent 2×2 pixels supplied from said plurality of calculation processing units, and supplies the parameters for each pixel including the detection result to said plurality of calculation processing units.

4. The image processing apparatus according to claim 3, wherein said texture processing unit calculates values of LODs and values of anisotropies based on the texture coordinate of the adjacent 2×2 pixels supplied from said plurality of calculation processing units, detects size of the texture data based on the values of LODs, and detects the aspect ratio of the texture data based on the values of anisotropies.

5. The image processing apparatus according to claim 4, wherein said texture processing unit calculates the values of LODs and the values of anisotropies for every adjacent 2×2 pixels in the stamps.

6. The image processing apparatus according to claim 1, wherein said pixel generation unit repeats n times (n is an integer not less than 1) the processings which supplies m (m is an integer not less than 1) pixels adjacent in the stamps one-pixel by one-pixel in parallel, to said plurality of calculators for each stamp.

7. The image processing apparatus according to claim 1, wherein the stamps are consisted of the adjacent 4×4 pixels, respectively; and
   said pixel generation unit supplies the adjacent 2×2 pixels in the stamps one-pixel by one-pixel, to said plurality of calculators of which a total number is four.

8. The image processing apparatus according to claim 7, wherein said plurality of calculators are scalar calculators in SIMD (Single Instruction Multiple Data) scheme.

9. An image processing system, comprising:
   a stamp generation unit configured to calculate values of typical pixels in stamps having a plurality of pixels and derivatives of parameters characterizing image;
   a plurality of image processing apparatuses which perform image processing in parallel based on a result calculated by said stamp generation unit; and
   a storage which stores a result processed by said plurality of image processing apparatuses,
   wherein each of said plurality of image processing apparatuses includes:
   a pixel generation unit configured to generate parameters of the pixels in the stamps based on the values of the typical pixels in the stamps having a plurality of pixels and the derivatives of the parameters characterizing image;
   a plurality of calculation processing units configured to perform image processing of the stamps different from each other based on the parameters of the pixels generated by said pixel generation unit; and
   a texture processing unit configured to perform processing related to the texture data in accordance with instructions from said plurality of calculation processing units, each of said plurality of calculation processing units has a plurality of calculators which perform image processing of the adjacent pixels in the corresponding stamp in parallel, and said pixel generation unit supplies the parameters of the adjacent pixels in the stamps which have no dependence to each other, to said plurality of calculation processing units, respectively, the parameters of the adjacent pixels in the stamp which have no dependence to each other indicating parameters of each pixel in a stamp are not influenced by parameters of each pixel in the other stamps.

10. The image processing system according to claim 9, wherein said stamp generation unit supplies the parameters of the adjacent pixels in the stamps which have no dependence to each other, to said plurality of calculation processing units.

11. The image processing system according to claim 9, wherein said parameters include tone values of RGB, transparency information, depth information, texture coordinates and normal vectors.

12. The image processing system according to claim 11, wherein said texture processing unit detects size of the texture data and aspect ratio thereof based on the texture coordinate of the adjacent 2×2 pixels supplied from said plurality of calculation processing units, and supplies the parameters for each pixel including the detection result to said plurality of calculation processing units.

13. The image processing system according to claim 12, wherein said texture processing unit calculates values of LODs and values of anisotropies based on the texture coordinate of the adjacent 2×2 pixels supplied from said plurality of calculation processing units, detects size of the texture data based on the values of LODs, and detects the aspect ratio of the texture data based on the values of anisotropies.

14. The image processing system according to claim 13, wherein said texture processing unit calculates the values of LODs and the values of anisotropies for every adjacent 2×2 pixels in the stamps.

15. The image processing system according to claim 9, wherein said pixel generation unit repeats n times (n is an integer not less than 1) the processings which supplies m (m is an integer not less than 1) pixels adjacent in the stamps one-pixel by one-pixel in parallel, to said plurality of calculators for each stamp.

16. The image processing system according to claim 9, wherein the stamps are consisted of the adjacent 4×4 pixels, respectively; and said pixel generation unit supplies the adjacent 2×2 pixels in the stamps one-pixel by one-pixel, to said plurality of calculators of which a total number is four.

17. The image processing system according to claim 16, wherein said plurality of calculators are scaler calculators in SIMD (Single Instruction Multiple Data) scheme.

18. An image processing method, comprising:

generating parameters of pixels in stamps based on values of typical pixels in the stamps having a plurality of pixels and derivatives of the parameters characterizing image;

supplying the parameters of the adjacent pixels in the stamps which have no dependence to each other, to a plurality of calculation processing units, the parameters of the adjacent pixels in the stamp which have no dependence to each other indicating parameters of each pixel in a stamp are not influenced by parameters of each pixel in the other stamps;

performing processing related to texture data in accordance with instructions from said plurality of calculation processing units; and performing pixel processing of the adjacent pixels in the corresponding stamp in parallel.

19. The image processing method according to claim 18, wherein said parameters include tone values of RGB, transparency information, depth information, texture coordinates and normal vectors.

20. The image processing method according to claim 19, wherein size of the texture data and aspect ratio thereof are detected based on the texture coordinate of the adjacent 2×2 pixels supplied from said plurality of calculation processing units, and the parameters for each pixel including the detection result are supplied to said plurality of calculation processing units.

* * * * *